United States Patent

Yamamoto et al.

[11] Patent Number: 5,523,353
[45] Date of Patent: Jun. 4, 1996

[54] RUBBER COMPOSITION

[75] Inventors: Keisaku Yamamoto; Kiyoshi Ikeda, both of Ichihara; Masahiro Fukuyama, Sodegaura, all of Japan

[73] Assignee: Sumitomo Chemical Company, Limited, Osaka, Japan

[21] Appl. No.: 235,919

[22] Filed: May 2, 1994

Related U.S. Application Data

[62] Division of Ser. No. 52,742, Apr. 27, 1993.

[30] Foreign Application Priority Data

May 11, 1992 [JP] Japan ................................. 4-117221
Aug. 24, 1992 [JP] Japan ................................. 4-223830

[51] Int. Cl.$^6$ .......................... C08L 23/08; C08L 33/02; C08L 33/06; C08L 33/14
[52] U.S. Cl. .......................... 525/193; 525/196; 525/365
[58] Field of Search ................................. 525/193, 196, 525/365, 208, 221, 227, 228

[56] References Cited

PUBLICATIONS

Translation of Japan 2-158640, Jun. 1990.

*Primary Examiner*—Vasu S. Jagannathan
*Attorney, Agent, or Firm*—Cushman Darby & Cushman

[57] ABSTRACT

A rubber composition is provided which comprises 100 parts by weight of ethylene-(meth)-acrylate copolymer rubbers and/or ethylene-(meth)-acrylate-unsaturated glycidyl ester copolymers, 5 to 300 parts by weight of a hydroxide of a typical metallic element belonging to Group II or III of the Mendeleev's periodic table and 0.1 to 50 parts by weight of a metallic acrylate compound. This composition keeps properties required for rubbers such as tensile strength, elasticity, scorch resistance and processability at high levels and is excellent in wear resistance and flame retardance.

34 Claims, No Drawings

RUBBER COMPOSITION

This is a division of application Ser. No. 08/052,742, filed Apr. 27, 1993.

The present invention relates to a rubber composition and in particular, to a rubber composition which keeps at high levels various characteristics required for rubbers, such as tensile strength, elasticity, scorch resistance and processability and is excellent in wear resistance and flame retardance.

It is known to improve flame retardance of rubber compositions by adding a hydroxide of magnesium or aluminum. However, there has not yet been provided a rubber composition which keeps various characteristics required for rubbers, such as tensile strength, elasticity, scorch resistance and processability at high levels and is excellent in wear resistance and flame retardance.

The object of the present invention is to provide a rubber composition which keeps at high levels various characteristics required for rubbers, such as tensile strength, elasticity, scorch resistance and processability and is excellent in wear resistance and flame retardance.

After intensive research, the inventors have accomplished the present invention.

One of the present invention relates to a rubber composition comprising 100 parts by weight of the following component (A), 5 to 300 parts by weight of the following component (B) and 0.1 to 50 parts by weight of the following component (C).

Component (A): Ethylene-acrylate or methacrylate (herein referred to "(meth)acrylate") copolymer rubbers and/or ethylene-(meth)acrylate-unsaturated glycidyl ester copolymer rubbers.

Component (B): Hydroxides of typical metal elements belonging to Group II or III of the Mendeleev's periodic table.

Component (C): At least one metallic acrylate compound represented by the following formula (I):

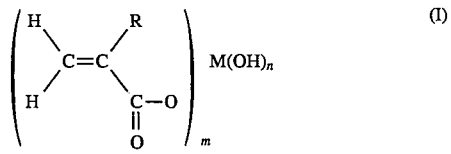

(wherein R represents a hydrogen atom or an alkyl group of 1 to 8 carbon atoms, M represents a mono- to tri-valent metallic atom, m represents an integer of 1 to 3 and n represents an integer of 0 to 2).

Another invention relates to a rubber composition comprising 100 parts by weight of the above component (A), 5 to 300 parts by weight of the above component (B) and 2 to 100 parts by weight of the following component (D).

Component (D): Ethylene copolymers containing carboxylic acids or acid anhydrides.

Still another invention relates to a rubber composition comprising 100 parts by weight of the above component (A), 5 to 300 parts by weight of the above component (B), 0.1 to 50 parts by weight of the above component (C) and 2 to 100 parts by weight of the above component (D).

The present invention will be explained in detail.

The component (A) comprises ethylene-(meth)-acrylate copolymer rubbers and/or ethylene-(meth)-acrylate-unsaturated glycidyl ester copolymer rubbers. The (meth)acrylate means an acrylate or a methacrylate. The (meth)acrylates are preferably those which are obtained from alcohols of 1–8 carbon atoms. Examples are methyl acrylate, methyl methacrylate, ethyl acrylate, ethyl methacrylate, n-butyl acrylate, n-butyl methacrylate, tert-butyl acrylate, tert-butyl methacrylate, 2-ethylhexyl acrylate and 2-ethylhexyl methacrylate. These may be used each alone or in combination of two or more.

Ratio (molar ratio) of ethylene to (meth)acrylate in the ethylene-(meth)acrylate copolymer rubbers is preferably (50 to 85):(50 to 15), more preferably (58 to 80):(42 to 20). If amount of the (meth)acrylate is too large, brittle point of the copolymer is high and properties as rubbers (elastomers) in low-temperature atmosphere are sometimes inferior. If it is too small, crystallinity of the copolymer is high and a sufficient elasticity for elastomer is not obtained in some case.

Examples of the unsaturated glycidyl esters are glycidyl acrylate, glycidyl methacrylate, diglycidyl itaconate, triglycidyl butenetricarboxylate and glycidyl p-styrenecarboxylate. With reference to the proportion of the unsaturated glycidyl ester in the ethylene-(meth)acrylate-unsaturated glycidyl ester copolymers, the molar ratio of (ethylene+(meth)acrylate):(unsaturated glycidyl ester) is preferably 1:(0.0005 to 0.05), more preferably 1:(0.001 to 0.03). When copolymer rubbers containing the unsaturated glycidyl ester in an amount of the above range are used, it becomes possible to vulcanize them with various vulcanizers utilizing the epoxy group of the glycidyl ester. Copolymer rubbers having no unsaturated glycidyl ester are able to be vulcanized with organic peroxides.

As the component (A), in addition to those which comprise ethylene and (meth)acrylate or comprise ethylene, (meth)acrylate and unsaturated glycidyl ester, there may be used copolymers comprising other units in addition to the above units so long as advantageous effects of the present invention are not damaged. Other units include, for example, isobutylene, styrene and derivatives thereof, vinyl acetate, and halogenated olefins such as tetrafluoroethylene and hexafluoropropylene. Preferred are those which have a melt index at 190° C. specified in JIS K6791 of 0.5 to 500 g/10 min. and more preferred are those which have the melt index of 0.5 to 50 g/10 min. If the melt index is too large, strength of the copolymers is insufficient and rubber elasticity is inferior. If the melt index is too small, processability of the copolymers is inferior.

The ethylene-(meth)acrylate copolymer rubbers or the ethylene-(meth)acrylate-unsaturated glycidyl ester copolymer rubbers are obtained by known polymerization methods such as free-radical initiated bulk polymerization, emulsion polymerization and solution polymerization. As an example, mention may be made of the method mentioned in Japanese Patent Kokoku No. 46-45085, namely, the method of preparation under a pressure of 500 kg/cm² or higher and a temperature of 40 to 300° C. in the presence of a polymerization initiator which produces free radicals.

The component (B) comprises hydroxides of typical metallic elements belonging to Group II or III of the Mendeleev's periodic table. Examples are magnesium hydroxide and aluminum hydroxide. These may be used each alone or in combination of two or more.

The component (C) comprises at least one metallic acrylate compound represented by the above formula (I). In the formula, R represents a hydrogen atom or an alkyl group of 1 to 8 carbon atoms, preferably a hydrogen atom or a methyl group, M represents a mono- to tri-valent metallic atom, m represents an integer of 1 to 3 and n represents an integer of 0 to 2. Examples of M are lithium, sodium, potassium, magnesium, calcium, strontium, barium, manganese, iron, cobalt, nickel, copper, silver, zinc and aluminum. Examples of the metallic acrylate compounds are zinc acrylate, magnesium acrylate, aluminum hydroxyacrylate, zinc methacrylate, magnesium methacrylate and aluminum hydroxymethacrylate. These may be used each alone or in combination of two or more. Furthermore, metallic polyacrylates may also be used as the compound represented by the formula (I).

The component (D) comprises ethylene copolymers containing carboxylic acids or acid anhydrides. Examples of the ethylene copolymers containing carboxylic acids or acid anhydrides are ethylene-maleic anhydride copolymer, ethylene-acrylate-maleic anhydride copolymer and ethylene-acrylate-maleic anhydride half ester copolymer. The ethylene-maleic anhydride copolymer may be a copolymer obtained by radical polymerization of ethylene and maleic anhydride under high pressures and a copolymer containing a radical copolymerizable monomer such as vinyl acetate, methyl methacrylate, ethyl acrylate or butyl acrylate in addition to ethylene and maleic anhydride.

The rubber composition of the present invention comprises components (A), (B) and (C), components (A), (B) and (D) or components (A), (B), (C) and (D).

Content of the component (B) is in the range of 5 to 300 parts by weight, preferably 10 to 200 parts by weight every 100 parts by weight of the component (A). If the content is too small, the composition is inferior in flame retardance and if it is too large, the composition is inferior in processability.

Content of the component (C) in the rubber compositions comprising components (A), (B) and (C) is in the range of 0.1 to 50 parts by weight, preferably 0.5 to 20 parts by weight every 100 parts by weight of the component (A). If the content is too small, the composition is inferior in wear resistance and if it is too large, the composition is inferior in processability.

Content of the component (D) in the rubber compositions comprising components (A), (B) and (D) is in the range of 2 to 100 parts by weight, preferably 5 to 50 parts by weight every 100 parts by weight of the component (A). If the content is too small, the composition is inferior in wear resistance and if it is too large, the composition is inferior in rubber elasticity and scorch resistance.

The rubber compositions of the present invention may comprise 100 parts by weight of the component (A), 5 to 300 parts by weight, preferably 10 to 200 parts by weight of the component (B), 0.1 to 50 parts by weight, preferably 0.5 to 20 parts by weight of the component (C) and 2 to 100 parts by weight, preferably 5 to 50 parts by weight of the component (D). When the rubber compositions contain all of the components (A), (B), (C) and (D) as above, wear resistance and tensile strength are further conspicuously improved.

Two or more ingredients in each of the components (A) to (D) may be used in combination. In this case, the total amount of them in each component must satisfy the range of the content of the component.

Method for production of the rubber compositions of the present invention and method for use thereof are as follows. The respective components and, if necessary, carbon black, organic peroxides, anti-oxidants, vulcanizing accelerators, processing aids, stearic acid, reinforcing agents, fillers, plasticizers, softening agents and others are mixed by usual kneaders such as roll mills and Banbury mixer to make a vulcanizable rubber composition. The resulting rubber composition is molded into a desired shape and subjected to vulcanization to make a vulcanized rubber composition which is a molded final article. The vulcanization is usually carried out at a temperature of 120° C. or higher, preferably 150° to 220° C. for about 1 to 30 minutes.

When copolymer rubbers having unsaturated glycidyl esters are used as component (A), the epoxy group is able to be a crosslinking site. Examples of the vulcanizers reactable with the epoxy group are combinations of quaternary ammonium salts, quaternary phosphonium salts and organic phosphorus compounds with organic acids and polyfunctional amine compounds.

As the organic peroxides, there may be used those which are generally used for crosslinking of rubbers. Examples of the organic peroxides are di-t-butyl peroxide, t-butylcumyl peroxide, dicumyl peroxide, α, α-bis(t-butylperoxyisopropyl)benzene, 2,5-dimethyl-2,5-di(t-butylperoxy)hexane, 2,5-dimethyl-2,5-di(t-butylperoxy)hexyne-3, 1,1-bis(t-butylperoxy)-3,3,5-trimethylcyclohexane, n-butyl-4,4-bis(t-butylperoxy)valerate, 2,2-bis(t-butylperoxy)butane and 2,2-bis(t-butylperoxy)octane.

Amount of the organic peroxide is preferably in the range of 1 to 10 parts by weight, more preferably in the range of 2 to 6 parts by weight every 100 parts by weight of the copolymer. If the amount is too small, crosslinking density is low and mechanical strength of the vulcanized rubber compositions is insufficient. If it is too large, problems such as blowing often occur at the time of vulcanization and molding. Furthermore, known crosslinking aids such as p,p'-dibenzoylquinone dioxime, quinone dioxime, triallyl cyanurate, sulfur, ethylene dimethacrylate, N,N'-m-phenylenebismaleimide, triallyl isocyanurate and trimethylolpropane trimethacrylate may be used for improving crosslinking efficiency in vulcanization with organic peroxides.

The rubber compositions of the present invention are able to be used in a wide field taking advantage of the excellent properties. Especially, they are suitable as covering materials for electric wires and cables used in multistory buildings, power stations, ships and various plants.

The present invention will be explained by the following Examples and Comparative Examples.

Examples 1–18 and Comparative Examples 1–5

The components shown in Table 1 (excluding peroxide and triallyl isocyanurate) were kneaded with a Brabender plastomill of 350 cc adjusted to 90° C. at a rotor velocity of 60 rpm for 5 minutes. Thereafter, peroxide and triallyl isocyanurate were added thereto and kneaded with an open roll mill of 6 inches to obtain a rubber composition. Then, the rubber composition was press vulcanized to obtain a vulcanized rubber. This vulcanized rubber was evaluated on properties in accordance with JIS K6301 except for the annotated properties.

Measurement of abrasion wear was conducted in the following manner. That is, the sample vulcanized rubber was subjected to preliminary abrasion of 500 times using a Taber machine (using a whetstone of H-18 and a load of 500 g) and was further subjected to abrasion of 1000 times and thereafter weight change of the sample was measured and the decrement in weight was taken as abrasion wear. The measurement was carried out 3 times and the average value was used for evaluation. Measurement of oxygen index (O.I.) was conducted in accordance with JIS K7201.

Results of the all evaluations are shown in Table 1.

From the results, the following are recognized.

That is, all of the Examples of the present invention show satisfactory results of evaluations. On the other hand, the samples of Comparative Examples 1–4 in which neither the component (C) nor the component (D) of the present invention were used were infrior in wear resistance. The sample of Comparative Example 2 was further inferior in tensile strength. Considerable scorching occurred in Comparative Example 5 where the component (A) was not used.

TABLE 1

| Components *1 (Part by weight) | Example 1 | Example 2 | Example 3 | Example 4 | Example 5 |
|---|---|---|---|---|---|
| Component (A) | | | | | |
| Kind *2 | A1 | A1 | A1 | A1 | A1 |
| Amount | 100 | 100 | 100 | 100 | 100 |
| Component (B) *3 | 100 | 100 | 100 | 100 | 100 |
| Component (C) | | | | | |
| C1 *4 | 1 | 3 | 0 | 0 | 0 |
| C2 | 0 | 0 | 0 | 0 | 0 |
| Component (D) | | | | | |
| Kind *5 | — | — | D1 | D1 | D1 |
| Amount | 0 | 0 | 5 | 10 | 20 |
| LDPE *6 | 0 | 0 | 0 | 0 | 0 |
| Evaluation Mooney scorch 125° C. | | | | | |
| Vm | 16.3 | 18.5 | 13.4 | 15.7 | 21.2 |
| t5 minute | 14.3 | 11.0 | 27.6 | 30.0 | 30.8 |
| t35 minute | 52.1 | 17.0 | >60 | >60 | >60 |
| Properties of vulcanized product *7 | | | | | |
| Tensile strength Kgf/cm$^2$ | 68 | 107 | 68 | 75 | 86 |
| Elongation | 310 | 210 | 390 | 390 | 370 |
| Hardness JIS-A | 74 | 79 | 72 | 76 | 81 |
| Taber abrasion wear g/1000 times | 0.3031 | 0.2278 | 0.5297 | 0.4791 | 0.3578 |
| Oxygen index (O.I.) | 30.0 | 30.0 | | | 28.0 |

| Components *1 (Part by weight) | Example 6 | Example 7 | Example 8 | Example 9 | Example 10 |
|---|---|---|---|---|---|
| Component (A) | | | | | |
| Kind *2 | A1 | A1 | A1 | A1 | A1 |
| Amount | 100 | 100 | 100 | 100 | 100 |
| Component (B) *3 | 100 | 100 | 100 | 100 | 100 |
| Component (C) | | | | | |
| C1 *4 | 0 | 0 | 0 | 0 | 0 |
| C2 | 0 | 0 | 0 | 0 | 0 |
| Component (D) | | | | | |
| Kind *5 | D2 | D2 | D2 | D3 | D3 |
| Amount | 5 | 10 | 20 | 10 | 20 |
| LDPE *6 | 0 | 0 | 0 | 0 | 0 |
| Evaluation Mooney scorch 125° C. | | | | | |
| Vm | 11.7 | 12.9 | 18.9 | 15.9 | 17.9 |
| t5 minute | 24.0 | 25.8 | 28.1 | 17.2 | 18.9 |
| t35 minute | >60 | >60 | >60 | 45.5 | 45.9 |
| Properties of vulcanized product *7 | | | | | |
| Tensile strength Kgf/cm$^2$ | 72 | 71 | 75 | 80 | 86 |
| Elongation | 430 | 400 | 410 | 320 | 330 |
| Hardness JIS-A | 70 | 72 | 73 | 71 | 72 |
| Taber abrasion wear g/1000 times | 0.5127 | 0.4780 | 0.3977 | 0.3910 | 0.2807 |
| Oxygen index (O.I.) | | | 28.0 | | |

TABLE 1-continued

| Components *1 (Part by weight) | Example 11 | Example 12 | Example 13 | Example 14 | Example 15 |
|---|---|---|---|---|---|
| Component (A) | | | | | |
| Kind *2 | A2 | A1 | A1 | A1 | A1 |
| Amount | 100 | 100 | 100 | 100 | 100 |
| Component (B) *3 | 100 | 100 | 100 | 100 | 100 |
| Component (C) | | | | | |
| C1 *4 | 0 | 1 | 2 | 3 | 0 |
| C2 | 0 | 0 | 0 | 0 | 3 |
| Component (D) | | | | | |
| Kind *5 | D1 | D1 | D1 | D1 | D3 |
| Amount | 10 | 20 | 20 | 20 | 20 |
| LDPE *6 | 0 | 0 | 0 | 0 | 0 |
| Evaluation Mooney scorch 125° C. | | | | | |
| Vm | 18.0 | 24.9 | 25.1 | 27.2 | 22.2 |
| t5 minute | 14.2 | 21.4 | 13.0 | 15.0 | 23.2 |
| t35 minute | 50.7 | >60 | 39.5 | 24.5 | >60 |
| Properties of vulcanized product *7 | | | | | |
| Tensile strength Kgf/cm$^2$ | 70 | 97 | 112 | 126 | 87 |
| Elongation | 340 | 280 | 220 | 210 | 330 |
| Hardness JIS-A | 75 | 81 | 82 | 84 | 81 |
| Taber abrasion wear g/1000 times | 0.4152 | 0.2504 | 0.1904 | 0.2109 | 0.2343 |
| Oxygen index (O.I.) | | | 28.0 | 28.0 | |

| Components *1 (Part by weight) | Example 16 | Example 17 | Example 18 | Example 19 |
|---|---|---|---|---|
| Component (A) | | | | |
| Kind *2 | A1 | A1 | A1 | A2 |
| Amount | 100 | 100 | 100 | 100 |
| Component (B) *3 | 100 | 100 | 100 | 100 |
| Component (C) | | | | |
| C1 *4 | 0 | 0 | 1 | 1 |
| C2 | 4 | 5 | 3 | 3 |
| Component (D) | | | | |
| Kind *5 | D1 | D1 | D1 | D1 |
| Amount | 20 | 20 | 20 | 20 |
| LDPE *6 | 0 | 0 | 0 | 0 |
| Evaluation Mooney scorch 125° C. | | | | |
| Vm | 23.2 | 24.5 | 23.1 | 31.8 |
| t5 minute | 23.1 | 21.3 | 13.8 | 8.1 |
| t35 minute | >60 | >60 | 54.5 | 39.8 |
| Properties of vulcanized product *7 | | | | |
| Tensile strength Kgf/cm$^2$ | 89 | 94 | 102 | 96 |
| Elongation | 290 | 270 | 270 | 260 |
| Hardness JIS-A | 82 | 83 | 82 | 80 |
| Taber abrasion wear g/1000 times | 0.2340 | 0.2497 | 0.2098 | 0.2324 |
| Oxygen index (O.I.) | | 28.0 | 28.0 | 28.0 |

TABLE 1-continued

| Components *1 (Part by weight) | Comparative example 1 | Comparative example 2 | Comparative example 3 | Comparative example 4 | Comparative example 5 |
|---|---|---|---|---|---|
| Component (A) | | | | | |
| Kind *2 | A1 | A2 | A1 | A1 | — |
| Amount | 100 | 100 | 100 | 100 | 0 |
| Component (B) *3 | 100 | 100 | 100 | 100 | 100 |
| Component (C) | | | | | |
| C1 *4 | 0 | 0 | 0 | 0 | 0 |
| C2 | 0 | 0 | 0 | 0 | 0 |
| Component (D) | | | | | |
| Kind *5 | — | — | — | — | D3 |
| Amount | 0 | 0 | 0 | 0 | 100 |
| LDPE *6 | 0 | 0 | 5 | 10 | 0 |
| Evaluation | | | | | |
| Mooney scorch 125° C. | | | | | |
| Vm | 8.6 | 19.5 | 11.7 | 10.9 | |
| t5 minute | 26.0 | 21.5 | 30.2 | 28.1 | *8 Measurement was impossible. |
| t35 minute | >60 | >60 | >60 | >60 | |
| Properties of vulcanized product *7 | | | | | |
| Tensile strength Kgf/cm² | 70 | 64 | 76 | 69 | |
| Elongation | 380 | 440 | 410 | 390 | |
| Hardness JIS-A | 65 | 61 | 72 | 73 | |
| Taber abrasion wear g/1000 times | 0.5937 | 0.5321 | 0.6044 | 0.5863 | |
| Oxygen index (O.I.) | 30 | | | | |

*1 Components
The following common components were used in addition to those shown in Table 1: 15 parts by weight of SEAST SO (FEF carbon black manufactured by Tokai Carbon Co.); 1 part by weight of stearic acid; 1 part by weight of stearylamine (0.5 part by weight in Examples 3 to 11 and Comparative Examples 1 to 5); 2 parts by weight of NOGUARD 445 (aging inhibitor manufactured by Uniroyal Co.); 8.8 parts by weight of DCP-40 (dicumyl peroxide manufactured by Nippon Oil & Fats Co., Ltd.); and 1 part by weight of triallyl isocyanurate.
*2 Component (A)
A1: Ethylene (66.3 mol %)-methyl acrylate (33.0 mol %)-glycidyl methacrylate (0.7 mol %) copolymer rubber.
A2: Ethylene (67.0 mol %)-methyl acrylate (33.0 mol %) copolymer rubber.
*3 Component (B)
KISUMA 5B (magnesium hydroxide manufactured by Kyowa Chemical Co.)
*4 Component (C)
C1: Compound of the formula (1) where R = hydrogen atom, M = Zn, m = 2, and n = 0 (zinc acrylate).
C2: Compound of the formula (1) where R = hydrogen atom, M = Al, m = 2, and n = 1 (aluminum acrylate).
*5 Component (D)
D1: BONDINE TX8030 [Ethylene (85.0% by weight)-maleic anhydride (3.5% by weight)-ethyl acrylate (11.5% by weight) copolymer having a melting point of 95° C. and an MFR (190° C.) of 3.0 g/10 min and manufactured by Sumitomo Chemical Co., Ltd.]
D2: BONDINE TX8390 [Ethylene (68% by weight)-maleic anhydride (2% by weight)-ethyl acrylate (30% by weight) copolymer having a melting point of 67° C. and an MFR (190° C.) of 7.0 g/10 min and manufactured by Sumitomo Chemical Co., Ltd.]
D3: VamacG (Ethylene-methyl acrylate-maleic anhydride half ester copolymer manufactured by DuPont Co.)
*6 LDPE
SUMIKASEN F702-3 (Low-density polyethylene having a melting point of 107° C. and an MFR (190° C.) of 6.7 g/10 min and manufactured by Sumitomo Chemical Co., Ltd.)
*7 Properties of vulcanized products
Properties of products vulcanized at 170° C. for 20 minutes.
*8 Scorch occurred and measurement of the properties was impossible.

As explained above, the present invention provides a rubber composition which keeps various properties required for rubbers such as tensile strength, elasticity, scorch resistance and processability at high levels and is excellent in wear resistance and flame retardance.

We claim:

1. A rubber composition which comprises 100 parts by weight of the following component (A), 10 to 200 parts by weight of the following component (B) and 5 to 50 parts by weight of the following component (D):

component (A): a copolymer rubber selected from the group consisting of ethylene-(meth)acrylate copolymer rubbers and ethylene-(meth)acrylate-unsaturated glycidyl ester copolymer rubbers, wherein the molar ratio of ethylene to (meth)acrylate in the ethylene-(meth)acrylate copolymer rubbers is from 50/50 to 85–15, and the molar ratio of (ethylene+(meth)acrylate) to unsaturated glycidyl ester in the ethylene-(meth)acrylate-unsaturated glycidyl ester copolymer rubbers is from 1/0.0005 to 1/0.05, component (B): a hydroxide of a metallic element belonging to Group II or III of Mendeleev's periodic table, and component (D): an ethylene copolymer containing a carboxylic acid or an acid anhydride.

2. A rubber composition according to claim 1, wherein the (meth)acrylate is obtained from an alcohol of 1 to 8 carbon atoms.

3. A rubber composition according to claim 1, wherein the (meth)acrylate is methyl acrylate, methyl methacrylate, ethyl acrylate, ethyl methacrylate, n-butyl acrylate, n-butyl methacrylate, tert-butyl acrylate, tert-butyl methacrylate, 2-ethylhexyl acrylate or 2-ethylhexyl methacrylate.

4. A rubber composition according to claim 1, wherein molar ratio of ethylene and (meth)acrylate in the ethylene-(meth)acrylate copolymer rubber is 50 to 85:50 to 15.

5. A rubber composition according to claim 1, wherein molar ratio of ethylene and (meth)acrylate in the ethylene-(meth)acrylate copolymer rubber is 58 to 80:42 to 20.

6. A rubber composition according to claim 1, wherein the unsaturated glycidyl ester is glycidyl acrylate, glycidyl methacrylate, diglycidyl itaconate, triglycidyl butenetricarboxylate or glycidyl p-styrene-carboxylate.

7. A rubber composition according to claim 1, wherein molar ratio of ethylene+(meth)acrylate: unsaturated glycidyl ester in the ethylene-(meth)-acrylate-unsaturated glycidyl ester copolymer is 1:0.0005 to 0.05.

8. A rubber composition according to claim 1, wherein molar ratio of ethylene+(meth)acrylate: unsaturated glycidyl ester in the ethylene-(meth)-acrylate-unsaturated glycidyl ester copolymer is 1:0.001 to 0.03.

9. A rubber composition according to claim 1, wherein the component (A) has a melt index at 190° C. specificied in JIS K6791 of 0.5 to 500 g/10 min.

10. A rubber composition according to claim 1, wherein the component (A) has a melt index at 190° C. specificied in JIS K6791 of 0.5 to 50 g/10 min.

11. A rubber composition according to claim 1, wherein the component (B) is magnesium hydroxide or aluminum hydroxide.

12. A rubber composition according to claim 1, wherein the component (D) is ethylene-maleic anhydride copolymer, ethylene-acrylate-maleic anhydride copolymer or ethylene-acrylate-maleic anhydride half ester copolymer.

13. A rubber composition according to claim 1, wherein content of the component (B) is in the range of 10 to 200 parts by weight per 100 parts by weight of the component (A).

14. A rubber composition according to claim 1, wherein content of the component (D) is in the range of 5 to 50 parts by weight per 100 parts by weight of the component (A).

15. A covering material for electric wires or cables which comprises the rubber composition of claim 1.

16. A rubber composition which comprises 100 parts by weight of the following component (A), 10 to 200 parts by weight of the following component (B), 0.5 to 20 parts by weight of the following component (C) and 5 to 50 parts by weight of the following component (D):

component (A): at least one of ethylene-(meth)acrylate copolymer rubbers and ethylene-(meth)acrylate-unsaturated glycidyl ester copolymers, component (B): a hydroxide of a metallic element belonging to Group II or III of Mendeleev's periodic table, component (C): at least one metallic acrylate compound represented by the following formula (I):

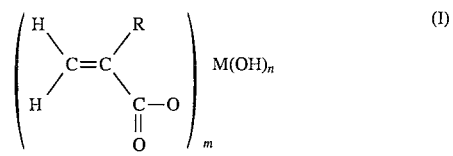

wherein R represents a hydrogen atom or an alkyl group of 1 to 8 carbon atoms, M represents a mono- to tri-valent metal atom, m represents an integer of 1 to 3 and n represents an integer of 0 to 2.

component (D): an ethylene copolymer containing a carboxylic acid or an acid anhydride.

17. A rubber composition according to claim 16, wherein the (meth)acrylate is obtained from an alcohol of 1 to 8 carbon atoms.

18. A rubber composition according to claim 16, wherein the (meth)acrylate is methyl acrylate, methyl methacrylate, ethyl acrylate, ethyl methacrylate, n-butyl acrylate, n-butyl methacrylate, tert-butyl acrylate, tert-butyl methacrylate, 2-ethylhexyl acrylate or 2-ethylhexyl methacrylate.

19. A rubber composition according to claim 16, wherein molar ratio of ethylene and (meth)acrylate in the ethylene-(meth)acrylate copolymer rubber is 50 to 85:50 to 15.

20. A rubber composition according to claim 16, wherein molar ratio of ethylene and (meth)acrylate in the ethylene-(meth)acrylate copolymer rubber is 58 to 80:42 to 20.

21. A rubber composition according to claim 16, wherein the unsaturated glycidyl ester is glycidyl acrylate, glycidyl methacrylate, diglycidyl itaconate, triglycidyl butenetricarboxylate or glycidyl p-styrene-carboxylate.

22. A rubber composition according to claim 16, wherein molar ratio of ethylene+(meth)acrylate: unsaturated glycidyl ester in the ethylene-(meth)-acrylate-unsaturated glycidyl ester copolymer is 1:0.0005 to 0.05.

23. A rubber composition according to claim 16, wherein molar ratio of ethylene+(meth)acrylate: unsaturated glycidyl ester in the ethylene-(meth)-acrylate-unsaturated glycidyl ester copolymer is 1:0.001 to 0.03.

24. A rubber composition according to claim 16, wherein the component (A) has a melt index at 190° C. specificied in JIS K6791 of 0.5 to 500 g/10 min.

25. A rubber composition according to claim 16, wherein the component (A) has a melt index at 190° C. specificied in JIS K6791 of 0.5 to 50 g/10 min.

26. A rubber composition according to claim 16, wherein the component (B) is magnesium hydroxide or aluminum hydroxide.

27. A rubber composition according to claim 16, wherein the component (C) has the formula (I) where M is lithium, sodium, potassium, magnesium, calcium, strontium, barium, manganese, iron, cobalt, nickel, copper, silver, zinc or aluminum.

28. A rubber composition according to claim 16, wherein the component (C) is zinc acrylate, magnesium acrylate, aluminum hydroxyacrylate, zinc methacrylate, magnesium methacrylate or aluminum hydroxymethacrylate.

29. A rubber composition according to claim 16, wherein the component (D) is ethylene-maleic anhydride copolymer, ethylene-acrylate-maleic anhydride copolymer or ethylene-acrylate-maleic anhydride half ester copolymer.

30. A rubber composition according to claim 16, wherein content of the component (B) is in the range of 10 to 200 parts by weight per 100 parts by weight of the component (A).

31. A rubber composition according to claim 16, wherein content of the component (C) is in the range of 0.5 to 20 parts by weight per 100 parts by weight of the component (A).

32. A rubber composition according to claim 16, wherein content of the component (D) is in the range of 5 to 50 parts by weight per 100 parts by weight of the component (A).

33. A rubber composition according to claim 16 which comprises 100 parts by weight of the component (A), 10 to 200 parts by weight of the component (B), 0.5 to 20 parts by weight of the component (C) and 5 to 50 parts by weight of the component (D).

34. A covering material for electric wires or cables which comprises the rubber composition of claim 16.

* * * * *